L. Letzkus,
Gear-Wheel Teeth.

Nº 80,291.      Patented July 28, 1868.

Witnesses
Thos B. Kerr
W D Lewis

Inventor:
John Letzkus
by Bakewell & Christy
his Attys.

United States Patent Office.

JOHN LETZKUS, OF ALLEGHENY CITY, PENNSYLVANIA, ASSIGNOR TO HIMSELF AND RICHARD BROWN, OF YOUNGSTOWN, OHIO.

*Letters Patent No. 80,291, dated July 28, 1868.*

IMPROVEMENT IN TEETH FOR GEAR-WHEELS.

*The Schedule referred to in these Letters Patent and making part of the same.*

TO ALL WHOM IT MAY CONCERN:

Be it known that I, JOHN LETZKUS, of Allegheny City, in the county of Allegheny, and State of Pennsylvania, have invented a new and useful Improvement in Teeth for Gear-Wheels; and I do hereby declare the following to be a full, clear, and exact description thereof, reference being had to the accompanying drawing, making a part of this specification, in which—

Figure 1:
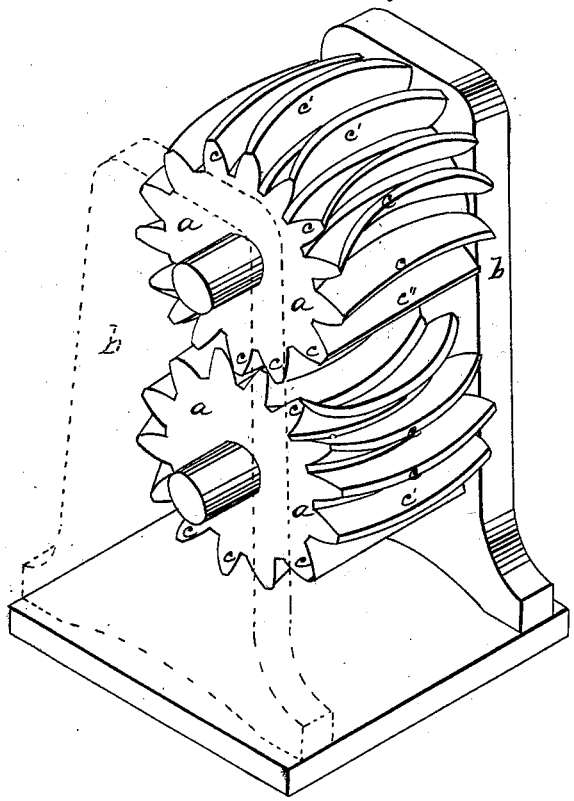
Figure 2:
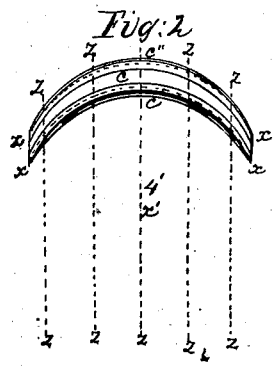

Figure 1 is a perspective view of a pair of gear-wheels provided with my improved gear-teeth, and Figure 2 is a plan view of a single such tooth.

The nature my invention consists in the construction of an improved form of gear-tooth for connecting gearing, whereby machinery may be made to run more evenly and uniformly and with less loss of power from friction and other causes, and less danger of breakage, than occurs with the toothed gearing in ordinary use.

To enable others skilled in the art to make and use my invention, I will proceed to explain its construction and manner of use.

$a\ a$ are two wheels, mounted, for convenience of illustration, in housings, $b$, and geared together by gear-teeth, $c$, arranged on their peripheries in the usual way, and differing in nothing from the ordinary gear-teeth, except that they are circular in form, and that the arcs which make up the inner and outer, or the working faces of each tooth, are described with a common radius from different centres, which centres lie in a line with each other. This form is more particularly shown in fig. 2, and is such that if a plane be passed through the tooth, parallel with the cylindrical face of the wheel on which it is placed, the lines of its intersection with the inner face $c'$ and outer face $c''$ of the tooth $c$ will be arcs of circles of a common radius, the distance between the centres of such arcs being equal to the distance between such arcs, measured on a straight line passing through such centres and protracted to cut both arcs.

It will then be found that if lines be drawn through both arcs, parallel to a straight line joining such centres, the parts of such parallel lines which lie between such arcs will always equal each other in length. This is illustrated in fig. 2 by red lines, $x\ x$ being a curve lying in the inner face of the tooth, and described from the centre $x'$, with any desirable radius, and $y\ y$ a curve lying in the outer face of the tooth, and described with the same radius from a centre, $y'$.

The distance between the centres $x'\ y'$ determines the thickness of the tooth at any particular point, such distance increasing from the upper face of the tooth $c$ to its base, so as to give it any desirable bevel. Then if a line joining the centres $x'\ y'$ be protracted to pass through the curves $x\ x$, $y\ y$, and other lines, $z\ z$, be drawn parallel to it through such curves, the parts of such parallel lines lying between the curves $x\ x, y\ y$, will always be equal. Hence gear-teeth so made will "mesh" into each other with perfect regularity, and play against each other throughout their entire length.

In laying out the teeth, any radius of curvature that may be desired may be employed, and accordingly as such radius be longer or shorter, will a less or greater number of teeth be in play at once.

In gearing such as that shown in fig. 1, three teeth are constantly in play. As they bite evenly and regularly throughout their whole length, there can be no jar in the operation of wheels so made. This shape of tooth also secures greater strength than belongs to the ordinary straight tooth. It is as easily made, is far more durable, and may be used in gearing machinery of every kind.

What I claim as my invention, and desire to secure by Letters Patent, is—

Curved gear-teeth for wheels and pinions, the upper and lower edges of which are arcs of curves of equal radius, having their centres in the same right line, constructed substantially as and for the purpose hereinbefore described.

In testimony whereof, I, the said JOHN LETZKUS, have hereunto set my hand.

JOHN LETZKUS.

Witnesses:
A. S. NICHOLSON,
G. H. CHRISTY.